United States Patent
Bönig et al.

(10) Patent No.: US 12,047,864 B2
(45) Date of Patent: Jul. 23, 2024

(54) METHOD FOR EARLY DETECTION OF FOREST FIRE AND FOREST FIRE EARLY DETECTION SYSTEM

(71) Applicant: DRYAD NETWORKS GMBH, Eberswalde (DE)

(72) Inventors: Marco Bönig, Dortmund (DE); Carsten Brinkschulte, Berlin (DE)

(*) Notice: Subject to any disclaimer, the term of this patent is extended or adjusted under 35 U.S.C. 154(b) by 0 days.

(21) Appl. No.: 17/798,915

(22) PCT Filed: Feb. 11, 2021

(86) PCT No.: PCT/EP2021/053350
§ 371 (c)(1),
(2) Date: Aug. 11, 2022

(87) PCT Pub. No.: WO2021/160749
PCT Pub. Date: Aug. 19, 2021

(65) Prior Publication Data
US 2023/0098107 A1    Mar. 30, 2023

(30) Foreign Application Priority Data

Feb. 11, 2020 (DE) .................... 10 2020 103 418.0
Feb. 11, 2021 (DE) .................... 10 2021 103 228.8

(51) Int. Cl.
| | |
|---|---|
| H04W 40/24 | (2009.01) |
| G08B 17/00 | (2006.01) |
| G08B 17/117 | (2006.01) |
| H04L 1/1607 | (2023.01) |
| H04W 4/12 | (2009.01) |
| H04W 4/38 | (2018.01) |
| H04W 84/18 | (2009.01) |
| H04W 88/16 | (2009.01) |

(52) U.S. Cl.
CPC ........ *H04W 40/246* (2013.01); *G08B 17/005* (2013.01); *G08B 17/117* (2013.01); *H04L 1/1607* (2013.01); *H04W 4/12* (2013.01); *H04W 4/38* (2018.02); *H04W 84/18* (2013.01); *H04W 88/16* (2013.01)

(58) Field of Classification Search
CPC ....... H04W 40/246; H04W 4/12; H04W 4/38; H04W 84/18; H04W 88/16; G08B 17/005; G08B 17/117; H04L 1/1607
See application file for complete search history.

(56) References Cited

U.S. PATENT DOCUMENTS

| | | |
|---|---|---|
| 7,154,095 B2 | 12/2006 | Luck et al. |
| 2008/0309502 A1 | 12/2008 | Boccia et al. |
| 2017/0230907 A1 | 8/2017 | Rose et al. |
| 2018/0374330 A1* | 12/2018 | Balaji ................ G08B 29/145 |

FOREIGN PATENT DOCUMENTS

| | | |
|---|---|---|
| CN | 107659889 | 2/2018 |
| DE | 10 2016 000 661 | 5/2017 |
| RU | 2 617 138 | 4/2017 |
| RU | 2617138 C1 * | 4/2017 |
| WO | 2012 107927 | 8/2012 |
| WO | 2019 048 603 | 3/2019 |

OTHER PUBLICATIONS

LoRa Alliance, "LoRaWAN Backend Interfaces 1.0 Specification" Oct. 11, 2017, 75 pages.

* cited by examiner

*Primary Examiner* — Curtis A Kuntz
*Assistant Examiner* — James E Munion
(74) *Attorney, Agent, or Firm* — JMB DAVIS BEN-DAVID

(57) ABSTRACT

The invention relates to a method for early detection of a forest fire using an end device having a sensor unit, the sensor unit performing signal detection in a first signal detection mode and in a second signal detection mode, and to a forest fire early detection system for performing the method.

6 Claims, 6 Drawing Sheets

METHOD FOR EARLY DETECTION OF FOREST FIRE AND FOREST FIRE EARLY DETECTION SYSTEM

CROSS-REFERENCE TO RELATED APPLICATIONS

Figure 1:
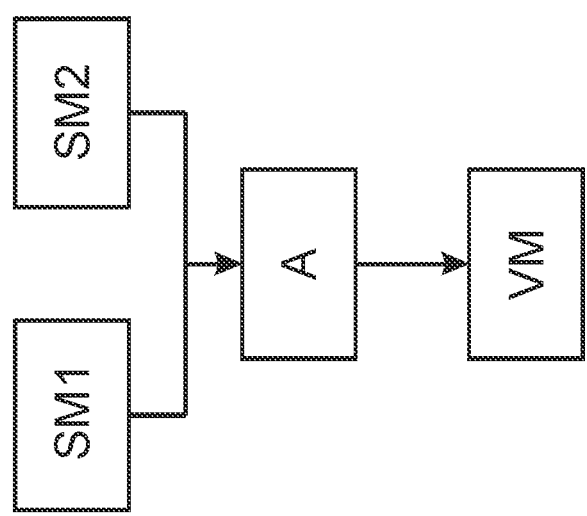

This is the U.S. National Stage of International Patent Application No. PCT/EP2021/053350 filed Feb. 11, 2021, which claims priority to German Patent Application No. 10 2020 103 418.0 filed Feb. 11, 2020, and German Patent Application No. 10 2021 103 228.8 filed Feb. 11, 2021.

The invention relates to a method for the early detection of a forest fire with the aid of an end device having a sensor unit, the sensor unit carrying out signal detection in a first signal detection mode and in a second signal detection mode, and to a forest fire early detection system for carrying out the method.

STATE OF THE ART

Systems for the early detection of forest fires are known. For this purpose, the area to be monitored is monitored by means of optical sensors that can detect smoke columns arising from a forest fire. These sensors are, for example, rotating cameras, but they have the disadvantage that they are less effective at night and are susceptible to false detections, e.g. dust clouds resulting from agricultural activities. In addition, optical systems can usually only detect the forest fire when it is already advanced and the smoke columns become visible over greater distances. Monitoring by means of an IR camera installed in a satellite from a high orbit has the disadvantage that the resolution of the cameras over the large distances prevents the detection of forest fires in the early phase. A satellite is also expensive to purchase and maintain, especially when launching the satellite. Monitoring by mini-satellites in a low orbit has the disadvantage that the satellites are not geostationary, i.e. they need a certain amount of time for one orbit during which the area is not monitored. Close monitoring requires a large number of satellites, which are also expensive to launch. Satellite monitoring is also associated with high carbon dioxide emissions during launch.

It makes more sense to monitor the area using a number of inexpensive sensors that can be produced in series and work by means of optical smoke detection and/or gas detection. The sensors are distributed throughout the area and supply data to a base station via a communication link.

Such a system for early detection of forest fires is presented in US 2008/0309502 A1. Here, when a fire alarm is triggered, a sensor provides information to a nearby control terminal, which then triggers an alarm by means of a long-range communication frequency signal.

This system has the disadvantage that the control terminal triggers the alarm and must have a powerful RF unit to do so. The sensors require a GPS unit that constantly sends a signal to the control terminal, the power consumption of the sensors is therefore high, and the life of the energy sources (batteries) of the sensors is limited.

It is therefore the task of the present invention to provide an early forest fire detection system as well as a method for the early detection of a forest fire, which operate reliably, can be expanded as required and are inexpensive to install and maintain.

The task is solved by means of the method for early detection of a forest fire according to claim 1. Further advantageous embodiments of the invention are set out in the dependent claims.

The method according to the invention for the early detection of a forest fire is carried out by means of an end device which has a sensor unit. By means of the sensor unit, signals are acquired in at least two different signal modes. For this purpose, a first signal acquisition is carried out in a first signal acquisition mode and a second signal acquisition is carried out in a second signal acquisition mode.

The two signal acquisition modes may differ based on the amount of time it takes to acquire. For example, the first signal acquisition mode may have a shorter acquisition time than the second signal acquisition mode, or vice versa. It is also possible for the two signal detection modes to be physically distinguishable: in the first signal detection mode, for example, smoke can be detected, and in the second signal detection mode, heat can be detected by means of infrared detection. Important in the sense of the invention is the difference of the detection of the signal by means of different signal detection modes. This increases the reliability and accuracy of the method according to the invention, because two independent detection modes are used for early detection of a forest fire.

In a further embodiment of the invention, the signals detected when performing the first signal detection mode are analysed. The signals detected by means of the first signal detection mode are analysed and checked to determine whether an event—a fire—is detected.

In a further embodiment of the invention, the performance of a first signal acquisition in a first signal acquisition mode of the sensor unit is repeated at a time interval. The time interval is adjustable by a user. For example, one signal acquisition can be performed per second, other time intervals are possible. In this way, the temporal resolution of the signal acquisition can be increased or decreased.

In an advantageous embodiment of the invention, the performance of a second signal acquisition in a second signal acquisition mode of the sensor unit is started event-driven. Such an event can be the failure of a system component of the end device, which prevents a signal acquisition in the first mode. Furthermore, a signal acquisition can take place in the second signal acquisition mode if an event (fire) was detected by means of the first signal acquisition. The signals of the first signal acquisition are thus checked, the procedure works more reliably than with signal acquisition in only one signal acquisition mode.

In a further embodiment of the invention, the event that starts the second signal detection in a second signal detection mode is based on the detected signals of the first signal detection and/or analysis thereof. The signals detected by means of the first signal detection mode are analysed and checked to see whether an event—a fire—is detected. If this is the case, a signal acquisition takes place in the second signal acquisition mode. The signals of the first signal acquisition are checked in this way, the procedure works more reliably than with signal acquisition in only one signal acquisition mode.

In a further embodiment of the invention, the event that starts the second signal acquisition in a second signal acquisition mode is the exceeding of a threshold value of the analysed data from the signals acquired in the first signal acquisition. The threshold value can be, for example, the concentration of a gas that occurs naturally in the area that is monitored by means of the method according to the invention. If this gas is detected by means of a first signal acquisition, it is useful to check whether a certain concentration (threshold value) to be defined by the user is exceeded. This check is carried out with the second signal detection in a second signal detection mode. As an alternative to exceeding the threshold value, the detection of a pattern or other conspicuous features of the acquired and/or analysed data can also be used as a triggering event.

In a further development of the invention, the detected second signals of the second signal detection mode are evaluated. The signals acquired by means of the second signal acquisition mode are analysed and checked to determine whether an event—a fire—has been detected.

In a further embodiment of the invention, a message is sent from the end device to a first gateway. The message is sent in particular when the evaluation of the first signal detection and the second signal detection has detected a fire. The message is sent as a data packet wirelessly or wired to a first gateway (node).

In a further embodiment of the invention, the notification signal is generated in the sensor unit when the data analysed from the detected second signals and/or from these exceed a second threshold value. The threshold value may be, for example, the concentration of a gas that is present in the area being monitored by means of the method according to the invention, for example of natural origin or from other sources. If this gas is detected by means of a second signal acquisition, the message is generated and forwarded to a first gateway.

In a further embodiment of the invention, the second signal acquisition mode comprises a gas analysis. The gas analysis may be performed using suitable gas detectors, e.g. catalytic gas detectors, semiconductor gas detectors or electrochemical gas detectors. In addition, a quantitative analysis may be performed.

In another embodiment of the invention, the first signal acquisition mode is based on a different physical principle than the second signal acquisition mode. The first signal acquisition mode is usually designed as a preliminary or coarse analysis. For this purpose, a simple, proven and inexpensive principle can be applied, e.g. smoke detection by means of an infrared LED. The second signal detection mode serves to increase the accuracy and, if necessary, quantitative analysis. Other principles are usually used for this, e.g. electrical.

In a further embodiment of the invention, the first signal detection mode is based on optical smoke detection. The optical chamber of the smoke detector contains an infrared light-emitting diode and a light-sensitive sensor, a so-called photodiode. The infrared LED continuously emits a test light beam that is invisible to the human eye and is directed in such a way that it does not directly hit the light-sensitive photodiode. If smoke particles are in the air and penetrate the optical chamber of the end device, the emitted infrared light beam of the LED is scattered and reflected by the smoke particles. Part of this scattered infrared light also falls on the light-sensitive photodiode.

The task is further solved by means of the forest fire early detection system according to the invention.

The forest fire early detection system according to the invention comprises an end device with a sensor unit. The sensor unit comprises a sensor operable in a first signal detection mode and a second signal detection mode.

The two signal acquisition modes may differ based on the amount of time it takes to acquire. For example, the first signal acquisition mode may have a shorter acquisition time than the second signal acquisition mode, or vice versa. It is also possible for the two signal detection modes to be physically distinguishable: in the first signal detection mode, for example, smoke can be detected, and in the second signal detection mode, heat can be detected by means of infrared detection. Important in the sense of the invention is the difference of the detection of the signal by means of different signal detection modes. This increases the reliability and accuracy of the method according to the invention, because two independent detection modes are used for early detection of a forest fire.

In a further embodiment of the invention, the first signal acquisition mode is different from the second signal acquisition mode. The first signal detection mode is usually designed as a preliminary or rough analysis. For this purpose, a simple, proven and inexpensive principle can be applied, e.g. smoke detection by means of an infrared LED. The second signal detection mode serves to increase the accuracy and, if necessary, quantitative analysis. Other principles are usually used for this, e.g. electrical.

In a further embodiment of the invention, the end device comprises an evaluation unit suitable and intended for evaluating the detected signals and for controlling the signal detection. The signals acquired by means of the first signal acquisition mode and the second signal acquisition mode are analysed and checked to determine whether an event—a fire—has been detected. At the same time, the evaluation unit controls the duration and timing of the two signal acquisition modes.

In another embodiment of the invention, the first signal detection mode and the second signal detection mode can be controlled separately. If an event (fire) was detected by means of the first signal detection, a signal detection takes place in the second signal detection mode. The signals of the first signal detection are checked in this way, the procedure works more reliably than with signal detection in only one signal detection mode.

In a further embodiment of the invention, the first signal acquisition mode is periodically repeatable and/or the second signal acquisition mode is activatable. The signals detected by means of the first signal detection mode are analysed and checked to determine whether an event—a fire—has been detected. If this is the case, a signal acquisition takes place in the second signal acquisition mode. The signals of the first signal acquisition are checked in this way, the procedure works more reliably than with signal acquisition in only one signal acquisition mode. Repeating the first signal acquisition mode increases the accuracy of the acquisition.

In another embodiment of the invention, the sensor unit comprises a first sensor element. The first signal acquisition mode is usually designed as a preliminary or rough analysis. For this purpose, a simple, proven and inexpensive principle of the first sensor element can be applied.

In a further development of the invention, the first sensor is a gas sensor. A gas sensor detects the presence of a defined gas, whereby the concentration of the gas must exceed a threshold value in order to be detected. Alternatively, instead of the threshold value, patterns or other peculiarities of the detected signals can also be recorded.

In a further embodiment of the invention, the measuring principle of the first sensor element is based on electrical signal detection or on optical signal detection. The first sensor element is usually designed as a preliminary or rough analysis. For this purpose, a simple, proven and inexpensive principle can be applied, e.g. smoke detection by means of an infrared LED as in a commercially available smoke detector. An optical method, such as a camera, can also be used.

In a further embodiment of the invention, the sensor unit comprises a second sensor element. The second sensor element is used to increase accuracy and possibly quantitative analysis. Other principles are usually applied for this purpose, e.g. electrical. The signals of the first sensor element are thus verified, the method works more reliably than with signal acquisition in only one sensor element.

In another embodiment of the invention, the end device is intended for off-grid use and has a self-sufficient energy supply. In order to be able to install and operate the end device even in inhospitable and, in particular, rural areas far away from energy supply, the end device is equipped with a self-sufficient energy supply. In the simplest case, the energy supply is a battery, which can also be rechargeable. However, the use of capacitors is also possible.

In a further embodiment of the invention, the stand-alone energy supply comprises an energy conversion device and/or an energy storage device. The use of, for example, solar cells provides a long service life for the end device. For this purpose, solar radiation is converted into electrical energy, which is stored in a battery or capacitor.

In an advantageous embodiment of the invention, the end device comprises a communication unit suitable for sending and receiving LPWAN messages. The end device is integrated into an LPWAN. LPWAN describes a class of network protocols for connecting low energy devices such as battery powered sensors to a network server. The protocol is designed to achieve long range and low energy consumption of the end devices with low operating costs.

Examples of embodiments of the method for early detection of a forest fire according to the invention and of the forest fire early detection system according to the invention are shown schematically in simplified form in the drawings and are explained in more detail in the following description.

SHOWING

FIG. 1: Basic principle of the procedure for early detection of a forest fire FIG. 2: Further development of the method for early detection of a forest fire FIG. 3: Further embodiment of the method for early detection of a forest fire FIG. 4 *a*: End device with one sensor FIG. 4 *b*: End device with a sensor and an energy conversion device FIG. 4 *c*: End device with two sensors FIG. 5: Forest fire early detection system network FIG. 6: Detailed view of the forest fire early detection system network FIG. 1 shows an example of the method according to the invention. In the first step of the method, a first acquisition and a second acquisition of signals are performed by a sensor unit S of a sensor ED in two different sensor modes SM1, SM2. In this embodiment example, the acquisition of signals in two different signal modes SM1, SM2 takes place simultaneously. Another possibility is the acquisition in complementary time periods. In a first time period, acquisition is performed in the first signal mode SM1, while acquisition is not performed in the second signal mode SM2, as well as vice versa. The acquisition in the sensor modes SM1, SM2 is performed continuously or in a time interval such that the acquisition is constantly repeated. This increases accuracy and reliability through redundancy of acquisition by using two independent sensor modes SM1, SM2 for acquisition. The signals acquired by the sensor unit S are analyzed in the microprocessor unit C of the end device ED. If a fire is detected based on the analysis A of the data, a message is generated and sent VM. The procedure is then restarted.

Figure 2:
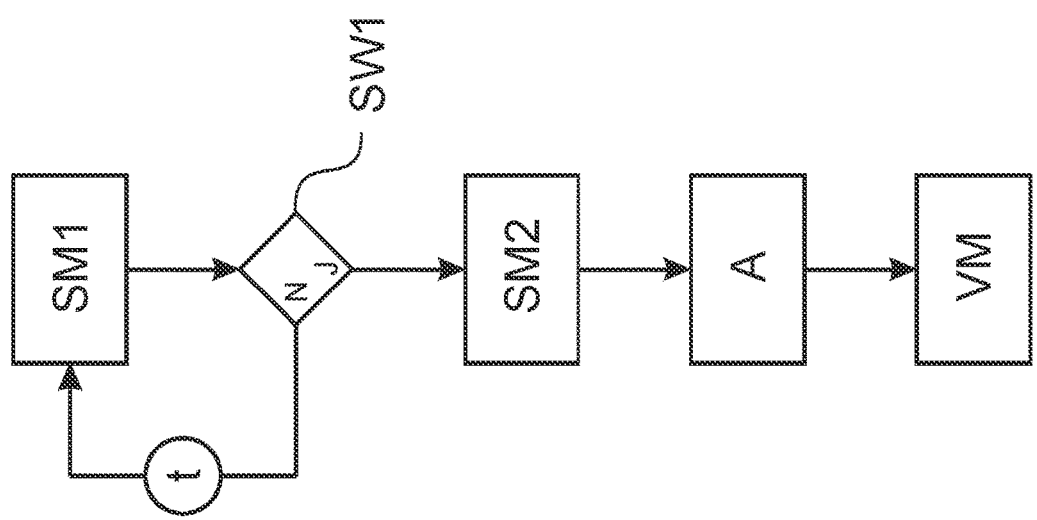

Another example of the method according to the invention is shown in FIG. 2. Here, the sensor modes SM1, SM2 are not operated in parallel, the sensor unit S initially operates in the first sensor mode SM1. The sensor unit S detects the scattered light of an infrared LED scattered by smoke by means of a photodiode and operates in the first sensor mode SM1 like a conventional smoke detector. The detection in the first sensor mode SM1 is continuous and is repeated in certain time intervals t. If a first event SW1 is detected by means of the first sensor mode SM1—i.e. smoke is detected or a threshold value is reached or exceeded—the evaluation unit C controls the sensor unit S in such a way that the sensor unit S detects signals in the second sensor mode SM2. For this purpose, the sensor unit S has two sensor elements S1, S2 whose measuring principle differs. While the first sensor element S1 is an optical smoke detector, the second sensor element S2 is a detector which detects gas by means of electrical and/or electrochemical methods, e.g. a semiconductor gas detector. Accuracy and reliability of detection are thus also increased. The signals detected by the sensor unit S are analysed in the microprocessor unit C of the end device ED A. If a fire is detected on the basis of the analysis of both the data detected in the first and second sensor modes SM1, SM2, a message is generated and sent VM.

Figure 3:
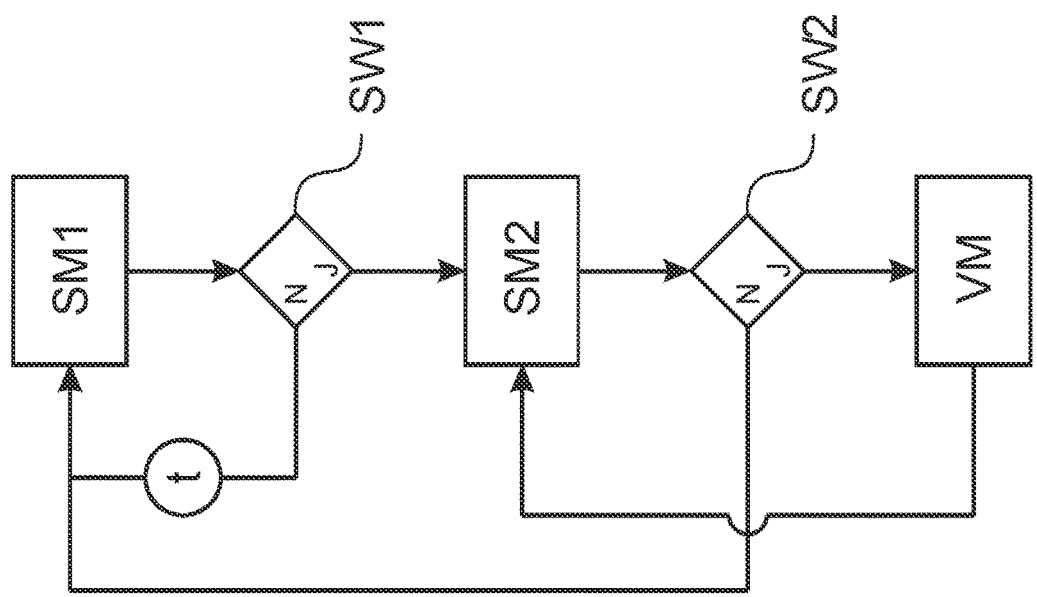

FIG. 3 shows a further example of the method according to the invention. Here the sensor modes SM1, SM2 are also not operated in parallel, the sensor unit S initially operates in the first sensor mode SM1. The sensor unit S also continuously detects the scattered light of an infrared LED scattered by smoke by means of a photodiode and records sensor data in the first sensor mode SM1. If a first event SW1 is detected by means of the first sensor mode SM1—i.e. smoke is detected—the evaluation unit C controls the sensor unit S in such a way that the sensor unit S detects signals in the second sensor mode SM2. For this purpose, the sensor unit S has two sensor elements S1, S2 whose measuring principle differs.

The signals detected by the sensor unit S are analysed in the microprocessor unit C of the end device ED. If, based on the analysis of the data acquired in sensor mode SM2, a fire is detected, for example by exceeding a threshold value SW2—i.e. a second event is detected, a message is generated and sent. The sensor unit S then continues to record data in the second sensor mode SM2 until no event (fire) is detected. A message is also generated and sent as long as an event is detected. However, if no more fire is detected based on the analysis of the data acquired in sensor mode SM2, the sensor unit S acquires sensor data in the first sensor mode SM1.

Figure 4A:
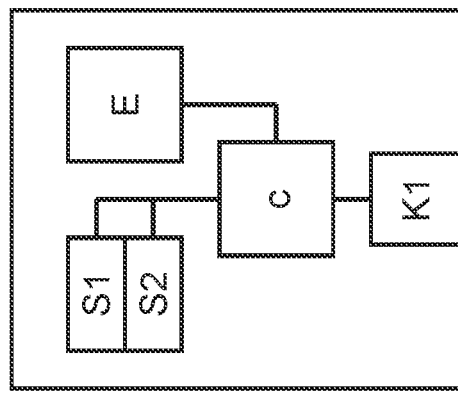
Figure 4B:
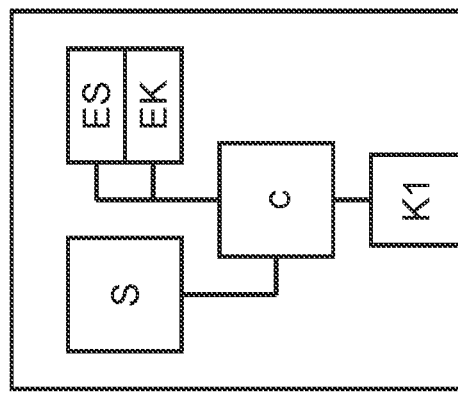
Figure 4C:
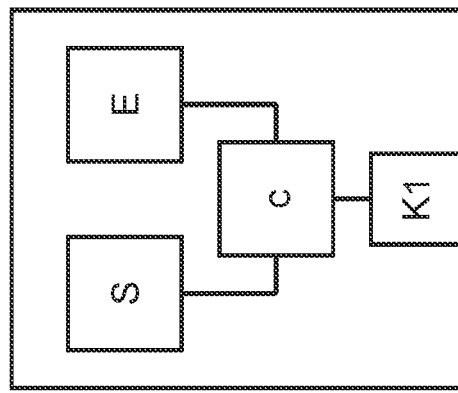

Three variants of an end device ED for detecting a forest fire are shown in FIG. 4. The end device ED is a sensor for detecting a forest fire. In order to be able to install and operate the end device ED even in inhospitable and especially rural areas far away from energy supply, the sensor ED is equipped with a self-sufficient energy supply E. In the simplest case, the energy supply E is a battery, which can also be rechargeable (FIG. 4 *a*). However, it is also possible to use capacitors (FIG. 4 *c*), especially supercapacitors. The use of solar cells (FIG. 4 *b*) is somewhat more complex and cost-intensive, but offers a very long service life of the sensor ED. In addition to the energy conversion EK by the solar cell, a memory ES and power electronics are also arranged in the sensor ED. Furthermore, a sensor ED has the actual sensor unit S (FIG. 4 *a, b*), which detects a forest fire, e.g. by means of optical and/or electronic processes. The sensor unit S can also have two sensor elements S1, S2 (FIG. 4 *c*). In this case, the two sensor elements S1, S2 differ from each other with regard to the measuring principle: In this embodiment example, the first sensor element S1 is a gas sensor which registers the scattered light of an infrared LED by means of a photodiode. The second sensor element is a semiconductor gas detector.

The end device ED has a microprocessor unit C for analysing the data supplied by the sensor unit S and for generating a message. The sensor ED also has the communication port K1. By means of the communication port K1, messages from the end device ED, in particular measurement data, are sent as a data packet wirelessly via the antenna A by means of a single-hop connection FSK via LoRa (chirp frequency spread modulation) or frequency modulation to a gateway G1, FGD, MDG. All of the above-mentioned components are arranged in a housing for protection against the effects of weather.

Figure 5:
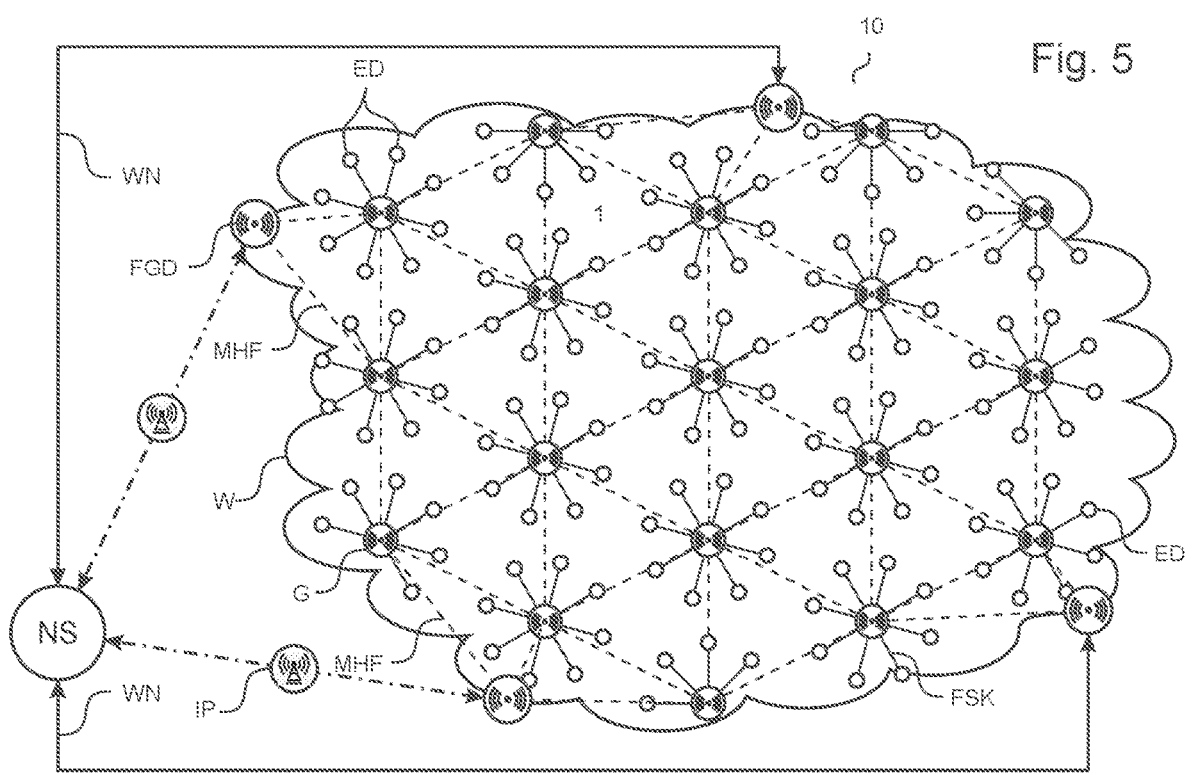

An embodiment of a forest fire early detection system 10 according to the invention is shown in FIG. 5. The forest fire early detection system 10 has a mesh gateway network 1 that uses the technology of a LoRaWAN network 1. The LoRaWAN network 1 has a star-shaped architecture in which message packets are exchanged between the sensors ED and a central internet network server NS by means of gateways.

The forest fire early detection system 10 has a plurality of sensors ED connected to gateways G via a single-hop connection FSK. The gateways G1 are usually front-end gateways FGD. The front-end gateways FGD are connected to each other and partly to border gateways G2. A border gateway G2 can also be combined with a front-end gateway FGD to form a mesh gateway device MDG in one device. The border gateways G2 are connected to the internet network server NS, either via a wired connection WN or via a wireless connection using internet protocol IP.

The front-end gateways FGD and the border gateways G2 are connected to each other via a meshed multi-hop communication network MHF, so that a front-end gateway FGD does not require a direct connection to the Internet network server NS. This achieves a range extension of LoRaWAN networks by interconnecting a multi-hop network by means of front-end gateways FGD, thus achieving full compatibility with the LoRaWAN specification.

Figure 6:
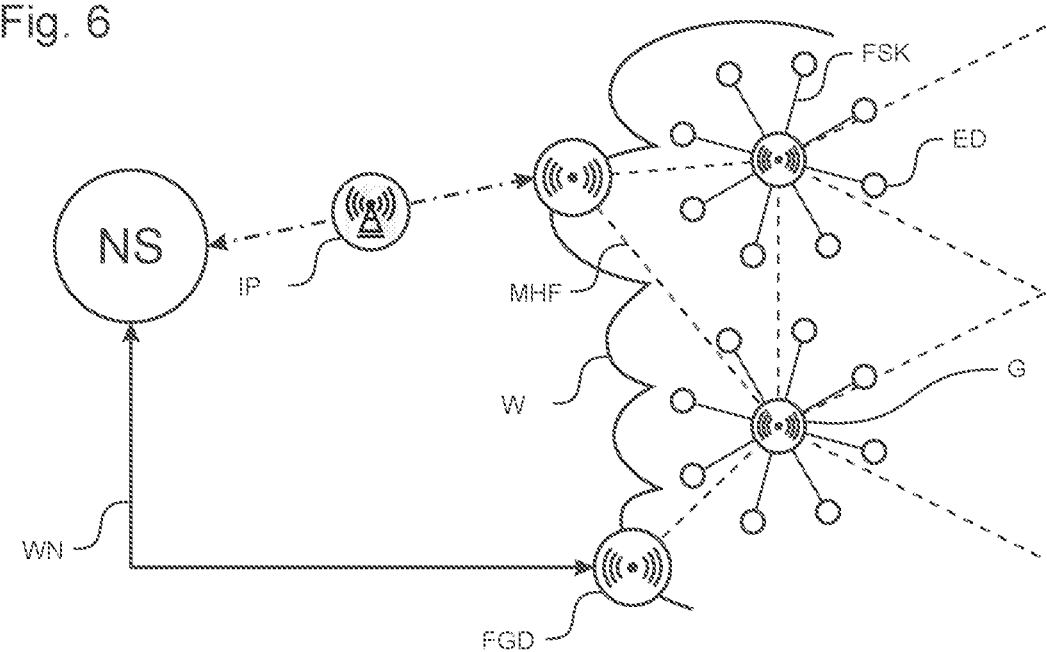

A detailed view of a forest fire early detection system 10 according to the invention is shown in FIG. 6. The forest fire early detection system 10 has a plurality of sensors ED, with eight sensors ED each being connected to a gateway G1 via a single-hop connection FSK. The gateways G1 are front-end gateways FGD. The front-end gateways FGD are connected to each other and to border gateways G2. The border gateways G2 are connected to the internet network server NS, either via a wired connection WN or via a wireless connection using internet protocol IP.

REFERENCE LIST

1 Mesh gateway network
10 Forest fire early detection system
ED, EDn1 End devices/sensors
G1 Gateway
G2 Border gateway
NS Internet network server
IP Internet Protocol
FGD, FGDn Front-end gateways
MHF Multi-hop communication network
MDG, MDGn Mesh gateways
FSK FSK modulation
WN Wired connection
W Forest
S Sensor
S1, S2 Sensor element
E Energy supply
ES Energy storage
EK Energy conversion
K1 Communication port
C Microprocessor unit
SM1 Sensor mode 1
SM2 Sensor mode 2
VM Dispatch message
A Antenna
SW1 First threshold value
SW2 Second. threshold value

The invention claimed is:

1. Method for early detection of a forest fire using an end device (ED) with a sensor unit (S),
characterised in that
the sensor unit (S) performs signal acquisition in a first signal acquisition mode (SM1) and in a second signal acquisition mode (SM2), wherein
an execution of a second signal acquisition in the second signal acquisition mode (SM2) of the sensor unit (S) is started event-controlled,
whereas the event starting the second signal acquisition in the second signal acquisition mode (SM2) is based on acquired signals of the first signal acquisition mode (SM1) and their analysis,
whereas the event that starts the second signal acquisition in the second signal acquisition mode (SM2) is the exceeding of a threshold value (SW1) of the analysed data from the signals acquired in the first signal acquisition mode (SM1), wherein
a message is sent from the end device (ED) to a first gateway (G1),
whereas the message is generated in the sensor unit (S) when acquired signals of the second signal acquisition in the second signal acquisition mode (SM2) exceeds a second threshold value (SW2),
the second signal acquisition mode (SM2) comprises a gas analysis and the first signal acquisition mode (SM1) is based on optical smoke detection.

2. Method for the early detection of a forest fire according to claim 1
characterised in that
performing a first signal acquisition in the first signal acquisition mode (SM1) of the sensor unit (S) is repeated in a time interval.

3. An early forest fire detection system (10) comprising an end device (ED), wherein the end device (ED) comprises a sensor unit (S),
characterised in that
the sensor unit (S) comprises a sensor operable in a first signal acquisition mode (SM1) and a second signal acquisition mode (SM2) and
the end device (ED) comprises an evaluation unit (C) suitable and intended for evaluating acquired signals and for controlling the signal acquisition, wherein
the first signal acquisition mode (SM1) is different from the second signal acquisition mode (SM2), wherein
the sensor unit (S) has a first sensor element (S1),
whereas the first sensor element (S1) is a gas sensor, whereas a measuring principle of the first sensor element (S1) is based on electrical signal detection or optical signal detection, whereas the sensor unit (S) has a second sensor element (S2).

4. An early forest fire detection system (10) according to claim 3, characterised in that the first signal acquisition mode (SM1) and the second signal acquisition mode (SM2) are controlled separately, whereas the first signal acquisition mode (SM1) is repeated periodically and/or the second signal acquisition mode (SM2) is activated.

5. An early forest fire detection system (10) according to claim 3, characterised in that the end device (ED) is intended for off-grid use and has a self-sufficient energy supply (E)

whereas the self-sufficient energy supply (E) has an energy conversion device (EK) and/or an energy storage device (ES).

6. An early forest fire detection system (10) according to claim 3, characterised in that the end device (ED) comprises a communication unit (K1) adapted to send and receive LPWAN messages.

* * * * *